Sept. 22, 1942.  F. ZAHN, JR  2,296,486
FILTER
Filed Sept. 18, 1939

INVENTOR.
Franklin Zahn Jr.
BY
A.B.Bowman
ATTORNEY.

Patented Sept. 22, 1942

2,296,486

UNITED STATES PATENT OFFICE 2,296,486

FILTER

Franklin Zahn, Jr., San Diego, Calif.

Application September 18, 1939, Serial No. 295,409

4 Claims. (Cl. 210—167)

My invention relates to a filter, more particularly adapted to filter oil or other liquid which is circulated and contained at a constant pressure and the objects of my invention are:

First, to provide a filter of this class in which a filter strip is automatically shifted in the path of the liquid permitting the dirty portion to be replaced by a clean portion of said strip at various intervals dependent upon its condition;

Second, to provide a filter of this class in which the collection of dirt on the filter strip lowers the outlet pressure of my filter causing the filter strip to shift automatically thereby placing a clean portion of the filter strip in the path of the liquid to be filtered;

Third, to provide a filter of this class in which the filter strip is shifted between revoluble filter control members;

Fourth, to provide a filter of this class in which a filter strip is shiftably controlled by mechanical means in cooperation with liquid pressure on the outlet side of said filter strip;

Fifth, to provide a filter of this class in which the filter strip is shifted from one reel to another as it is used, thereby permitting the replacement of clogged portions thereof; and Sixth, to provide a filter of this class which is very simple and economical of construction, efficient in its action and which will not readily deteriorate or get out of order.

Figure 1:
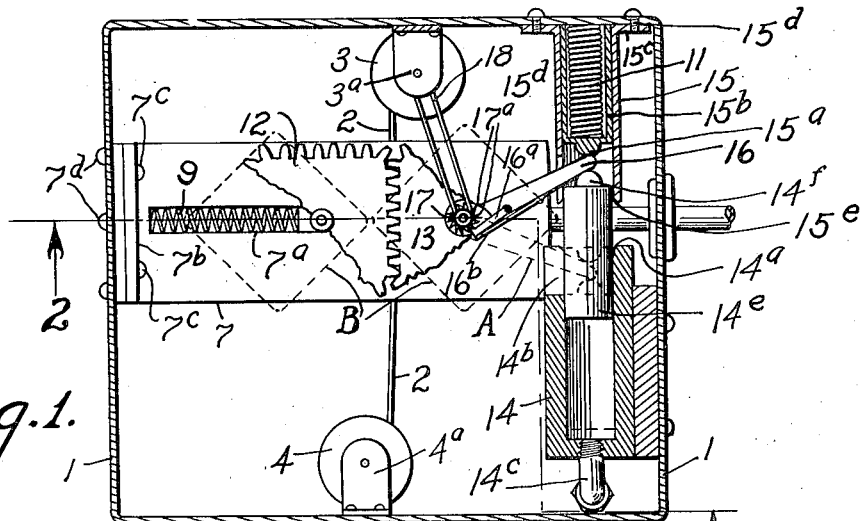
Figure 2:
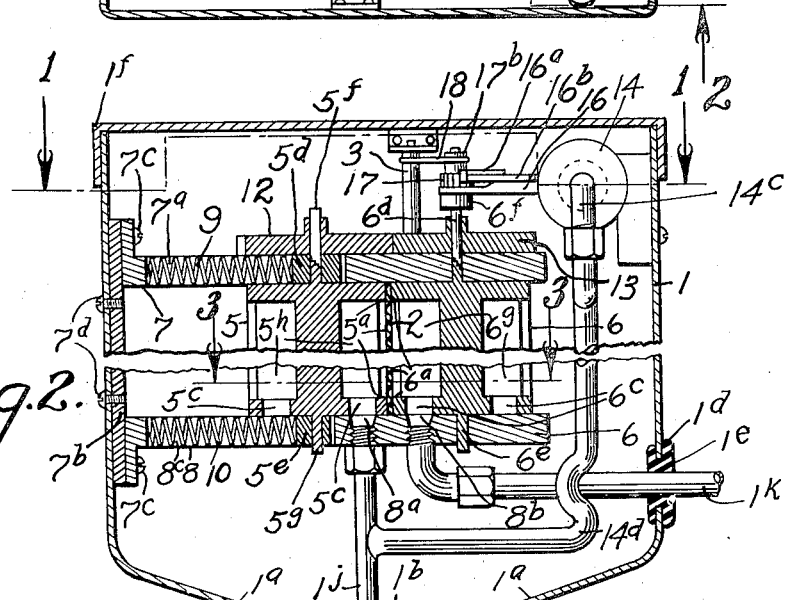
Figure 3:
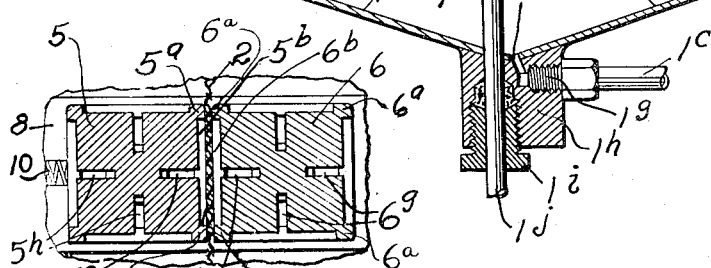

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary sectional view of my filter taken from the line 1—1 of Fig. 2 showing parts and portions in elevation to facilitate the illustration and showing by dash lines varying positions of parts; Fig. 2 is a fragmentary sectional view taken from the line 2—2 of Fig. 1 showing parts and portions in elevation to facilitate the illustration; and Fig. 3 is a fragmentary sectional view taken from the line 3—3 of Fig. 2.

Similar characters of reference refer to similar parts and portions throughout the several views of the drawings:

The casing 1, filter strip 2, filter strip supporting reels 3 and 4, filter strip control members 5 and 6, supporting brackets 7 and 8, compression springs 9, 10 and 11, gears 12 and 13, pressure cylinder 14, compression cylinder 15, ratchet arm 16, ratchet wheel 17 and belt 18 constitute the principal parts of my filter.

The casing 1 is substantially the shape as shown in Figs. 1 and 2 and is provided with a downwardly and angularly extending bottom portion 1a, in the center of which is positioned a hole 1b which communicates with a drain tube 1c. This drain tube 1c is secured to a conventional fitting 1g which is screw threaded in a block 1h secured by welding or otherwise to the lower side of the casing 1. Screw threaded in this block 1h is a packing gland 1i which surrounds the pressure outlet tube 1j. Positioned in a hole 1d in one side of the casing 1 is a gasket 1e which supports the pressure inlet tube 1k. On the upper end of the casing 1 is positioned a cover member 1f. The filter strip 2 is made of fine fabric, filter paper, or other suitable material and is supported on the revoluble reels 3 and 4 mounted opposing each other on the inner sides of the casing 1 by means of the brackets 3a and 4a respectively as shown in Fig. 1.

Intermediate the reels 3 and 4, the filter strip 2 is compressed between the edge portions 5a and 6a of adjacent sides of the filter strip control members 5 and 6 respectively. Said edges 5a and 6a of the members 5 and 6 are arranged in rectangular form providing rectangular openings 5b and 6b within the boundaries of said edges 5a and 6a respectively. It will be noted that these openings 5b and 6b are separated by the filter strip 2 and that said openings communicate with narrow rectangular valve ports 5c and 6c in the lower ends of the members 5 and 6 by means of longitudinal slot portions 5h and 6g as shown best in Figs. 2 and 3. These ports 5c and 6c communicate with the outlet port 8a and the inlet port 8b respectively of the supporting bracket 8. Secured in the bracket 8 and communicating with the inlet port 8b is an inlet conductor tube 1k. The filter strip control member 6 is revolubly mounted at its opposite ends in the supporting brackets 7 and 8 by means of its extending shaft portions 6d and 6e respectively. The filter strip control member 5 is revolubly mounted in bushings 5d and 5e on its extending shaft portions 5f and 5g on the opposite ends of said member 5, and said bushing 5d and 5e are shiftably mounted in slots 7a and 8c respectively of the supporting brackets 7 and 8. Engaging these bushings 5d and 5e are compression springs 9 and 10 respectively.

It will be noted that the filter strip control members 5 and 6 are each provided with a plurality of sides which are duplicates and are synchronized with corresponding sides of each other by means of meshed square gears 12 and 13 fixed on the extending shaft portions 5f and 6d respectively of said members 5 and 6. The supporting brackets are secured in spaced relation to each other on a bar member 7b by means of bolts 7c and said member 7b is secured to the inner side of the casing 1 by means of bolts 7d. Fixed on the extending shaft portion 6d is a collar member 6f and a ratchet wheel 17. Revolubly mounted on said shaft portion 6d intermediate said collar member 6f and said ratchet wheel 17 is one end of the ratchet arm 16. Shiftably secured on this arm 16 is ratchet member 16a which is arranged to engage ratchet teeth 17a of the ratchet wheel 17, said ratchet member being provided with a spring 16b which tends to hold said member 16a in engagement with the teeth 17a of the ratchet wheel 17. The ratchet wheel 17 is provided with an extending hub portion 17b on which the belt 18 is positioned. This belt 18 engages the reel 3 and is so arranged that it will slip when the filter strip 2 has formed an enlarged roll on said reel 3.

The pressure cylinder 14 is substantially hollow cylindrical in shape and is provided with an open end portion 14a and a slot portion 14b in the side thereof, and screw threaded in its opposite end is a conductor tube connection 14c communicating with the outlet tube 1j by means of the tube 14d which is brazed or otherwise connected thereto. Reciprocally mounted in the cylinder 14 is a piston 14e engageable with liquid entering the cylinder 14 via said connection 14c and tube 14d. The piston 14e is provided with a curved outer end portion 14f which is arranged to engage one side of the ratchet arm 16 near its free end. Engaging the opposite side of the ratchet arm 16 near its free end is an end portion 15a of the hollow cylindrical piston 15b which is reciprocally mounted in the compression cylinder 15. This cylinder 15 is provided with a flange portion 15c on its one end being thereby secured to the inner side of the casing 1 by means of bolts 15d and in the side of its open end 15e is positioned a slot portion 15f. The compression spring 11 is interposed between the inner side of the casing 1 and the piston 15b and is surrounded by said piston 15b.

The operation of my filter is substantially as follows: Liquid under pressure enters the inlet tube 1k and passes through the valve ports 8b and 6c respectively and into the opening 6b via the slot portions 6g and passes through the filter strip 2 depositing foreign matter thereon and the liquid then flows out through the valve ports 5c and 8a and into the outlet tube 1j. Communicating with the tube 1j by means of a tube 14d is the pressure cylinder 14 in which the piston 14e is forced outwardly against the ratchet arm 16 by means of the pressure of the liquid thereon, and said pressure when normal supports the piston 14e in substantially the position shown in Fig. 1. When the liquid under pressure has deposited a sufficient amount of dirt and foreign matter on the filter strip 2 to cause resistance to the passage of said liquid, the pressure of the liquid decreases on the outlet side of the filter strip 2 adjacent the member 5 and the liquid communication with the piston 14e in the pressure cylinder 14 decreases in pressure in proportion to the liquid on the outlet side of the filter strip 2 permitting said piston 14e to be forced inwardly into the cylinder 14 by means of the compression spring 11 acting on the piston 15b which in turn shifts the ratchet arm 16 to the position A as indicated by dash lines in Fig. 1. When said ratchet arm 16 shifts to the position A, the ratchet member 16a in engagement with the ratchet wheel 17 revolves the filter strip control members 6 and the member 5 which is revolubly connected therewith by means of the square gears 12 and 13. It will be noted that as the corners of the members 5 and 6 engage each other at their adjacent sides, the filter strip 2 is held securely therebetween and the axis of the member 5 shifts away from the member 6 as shown by dash lines B in Fig. 1 by means of the bushings 5d and 5e which are shiftably mounted in the bracket members 7 and 8 respectively. When the members 5 and 6 turn slightly past the position as indicated by dash lines B, they are further revolved by means of the compression springs 9 and 10 until two corresponding sides of the members 5 and 6 come together on each side of the filter strip 2. The dirty portion of the filter strip 2 is forced outwardly toward the reel 3 and is wound thereon by means of the belt 18 in engagement therewith as it is turned by the portion 17b of the ratchet wheel 17. When the reel of dirty filter strip enlarges, the belt 18 slips to compensate said enlargement. During the operation of shifting the filterstrip 2 and the members 5 and 6, the valve ports 5c and 6c are shifted out of cooperative relation to the valve ports 8a and 8b and the liquid inlet is thereby shut off. The liquid remaining in the sides of the members 5 and 6 adjacent the filter strip 2 flows through the hole 1b and into the drain tube 1c and to the reservoir, not shown. When pressure again builds up on the outlet side of the filter strip, the cylinders 14 and 15 and the ratchet mechanism again assumes substantially the position as shown in Fig. 1.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a filter of the class described, the combination of a casing provided with a fluid inlet and a fluid outlet, reels revolubly mounted at opposite sides of said casing, a filter strip mounted on said reels and extending from one reel to the other for transfer from one reel to the other upon rotation of said reels, opposed revoluble intermittently operated filter strip control members having fluid confining flat side portions and pocket portions in said flat side portions on opposite sides of said strip intermediate said rolls with said flat side portions in contact with said filter strip, said fluid inlet having communication with the pocket portion of one of said control members, and the fluid outlet having communication with the pocket portion of the other control member, one of said control members being movable away from said other control member upon rotation of said control members, means for simultaneously rotating said control members and said reels to feed said filter strip from one reel to the other and to place a fresh portion of said strip between the flat side portions and pocket portions of said members.

2. In a filter of the class described, the combination of a casing provided with a fluid inlet and a fluid outlet, reels revolubly mounted at opposite sides of said casing, a filter strip mounted on said reels and extending from one reel to the other for transfer from one reel to the other upon rotation of said reels, opposed revoluble intermittently operated filter strip control members having fluid confining flat side portions and pocket portions in said flat side portions on opposite sides of said strip intermediate said rolls with said flat side portions in contact with said filter strip, said fluid inlet having communication with the pocket portion of one of said control members, and the fluid outlet having communication with the pocket portion of the other control member, one of said control members being movable away from said other control member upon rotation of said control members, means for simultaneously rotating said control members and said reels to feed said filter strip from one reel to the other and to place a fresh portion of said strip between the flat side portions and pocket portions of said members, and pressure control means communicating with the outlet side of said strip for operating one of said filter strip control members.

3. In a filter of the class described, the combination of a casing provided with a fluid inlet and a fluid outlet, reels revolubly mounted at opposite sides of said casing, a filter strip mounted on said reels and extending from one reel to the other for transfer from one reel to the other upon rotation of said reels, opposed revoluble intermittently operated filter strip control members having fluid confining flat side portions and pocket portions in said flat side portions on opposite sides of said strip intermediate said rolls with said flat side portions in contact with said filter strip, said fluid inlet having communication with the pocket portion of one of said control members, and the fluid outlet having communication with the pocket portion of the other control member, one of said control members being movable away from said other control member upon rotation of said control members, means for simultaneously rotating said control members and said reels to feed said filter strip from one reel to the other and to place a fresh portion of said strip between the flat side portions and pocket portions of said members, pressure control means communicating with the outlet side of said strip for operating one of said filter strip control members, and means for connecting said filter strip control members for conforming simultaneous cooperation.

4. In a filter of the class described, the combination of a casing provided with a fluid inlet and a fluid outlet, reels revolubly mounted at opposite sides of said casing, a filter strip mounted on said reels and extending from one reel to the other for transfer from one reel to the other upon rotation of said reels, opposed revoluble intermittently operated filter strip control members having fluid confining flat side portions and pocket portions in said flat side portions on opposite sides of said strip intermediate said rolls with said flat side portions in contact with said filter strip, said fluid inlet having communication with the pocket portion of one of said control members, and the fluid outlet having communication with the pocket portion of the other control member, one of said control members being movable away from said other control member upon rotation of said control members, means for simultaneously rotating said control members and said reels to feed said filter strip from one reel to the other and to place a fresh portion of said strip between the flat side portions and pocket portions of said members, pressure control means communicating with the outlet side of said strip for operating one of said filter strip control members, means for connecting said filter strip control members for conforming simultaneous cooperation, and yieldable compression means tending to hold said filter strip control members towards each other and in engagement with said filter strip.

FRANKLIN ZAHN, Jr.